Aug. 11, 1970     F. V. GUERRERO     3,523,852
MACHINE FOR AUTOMATICALLY CEMENTING COUPLINGS
TO PLASTIC PIPE
Filed Sept. 21, 1967     2 Sheets-Sheet 1

INVENTOR.
FERNANDO V. GUERRERO
BY
William A. Mikesell Jr.
ATTORNEY.

United States Patent Office 3,523,852
Patented Aug. 11, 1970

3,523,852
MACHINE FOR AUTOMATICALLY CEMENTING COUPLINGS TO PLASTIC PIPE
Fernando V. Guerrero, Solon, Ohio, assignor to Continental Oil Company, Ponca City, Okla., a corporation of Delaware
Filed Sept. 21, 1967, Ser. No. 669,423
Int. Cl. B32b 31/00
U.S. Cl. 156—350    8 Claims

ABSTRACT OF THE DISCLOSURE

Machine to automatically cement a coupling onto an end of a plastic pipe, comprising means to apply liquid cement to the pipe end, and means to position a coupling on the cement-bearing end.

---

This invention relates to a device for automatically cementing a coupling onto the end of a plastic pipe or conduit. In one aspect, the invention comprises means to apply a measured amount of liquid adhesive onto the outer surface of a pipe or conduit, at one end thereof, and means to position a coupling onto the cement-bearing end. In another aspect, the invention further comprises means to apply a rotary or twisting motion to the coupling during the positioning step.

Plastic pipe and conduit is typically marketed with a suitable plastic coupling cemented to one end. This reduces time of field assembly by the installer, and is now expected by the purchaser. However, so far as is known, the pipe manufacturer has in the past had to apply this coupling in a manual operation; this has been not only costly with respect to requiring additional labor, but also has been time-consuming to the extent of comprising a bottle-neck in an otherwise automated pipe or conduit production line.

It is accordingly an object of this invention to provide apparatus for automatically cementing a coupling onto the end of a plastic pipe. Other aspects, objects and the several advantages of the invention will become apparent upon study of this disclosure, the appended claims, and the drawing, in which:

Figure 1:
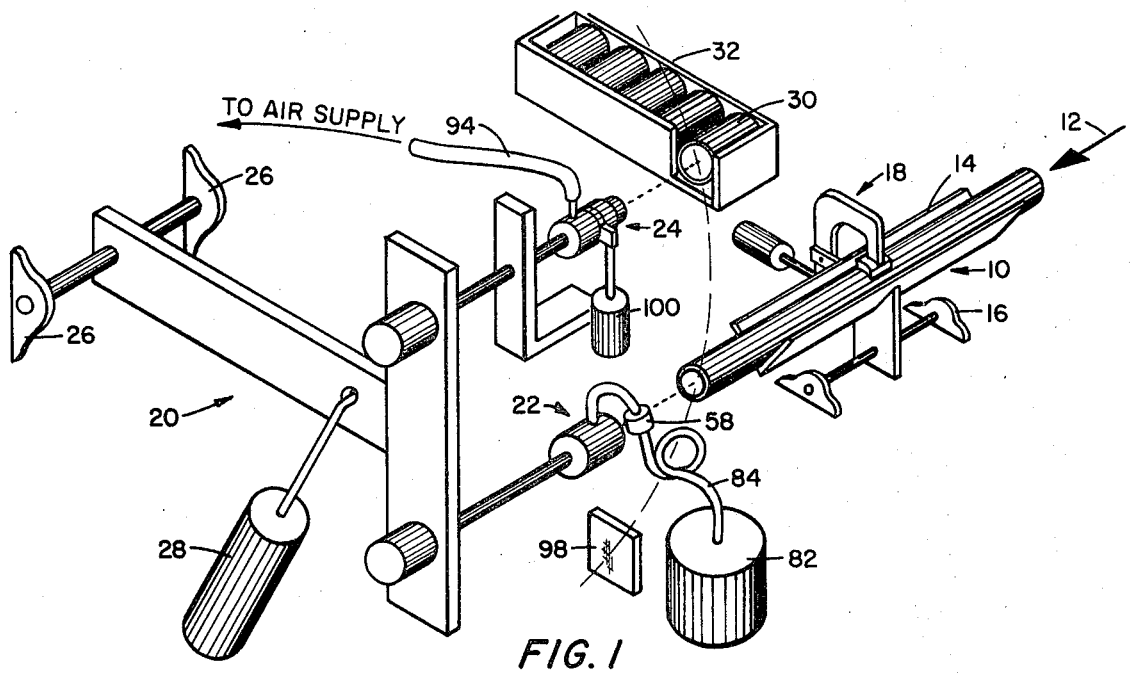
FIG. 1 is a schematic view of a preferred embodiment of the invention.

Generally speaking, the present invention comprises means for positioning a plastic pipe, means for applying liquid adhesive or cement to the outer surface of one end of the pipe, and means for installing a pipe coupling onto the cement-bearing end, the preceding means all being actuated automatically and in response to a time cycle. It will become obvious that the invention is suitable for installing any type of cementable fitting onto the end of any cementable pipe, although such are commonly plastic. A more complete understanding of the invention will be gained by reference to the drawing.

In FIG. 1, the means for positioning the plastic pipe is indicated generally as 10. The purpose of this means is to receive a section or length of plastic pipe, from above as by gravity or by being pushed in axially as shown by arrow 12, to clamp and hold the section in a predetermined position for a period of time, and to then release the completed section, with its coupling cemented on, and pass it on in the production line, as by dumping it onto a conveyor or into storage. It is presently preferred that the pipe be pushed into position axially, as by powered rollers, not shown, controlled by a microswitch, not shown, to stop axial motion when the pipe has reached the desired position. The pipe is positioned in a suitable holder such as trough 14, which is pivotally mounted on bearing assembly 16. A timing device, to be explained later, actuates clamping device 18 to firmly grip the pipe into trough 14 when it has reached the predetermined position. Clamping device 18 can comprise, for example, a pneumatically or hydraulically powered piston with a gripping jaw.

Turning next to the apparatus for applying adhesive to the pipe section end, and for installing a coupling on the cement-bearing end, reference is again made to FIG. 1. This portion of the invention comprises basically a transport arm indicated generally at 20, which carries a cement applying device indicated generally at 22 and a coupling positioning device indicated generally at 24. Arm 20 is pivotally mounted at bearings 26 and is movable through an arc by power cylinder 28 such that cement device 22 is axially aligned with the pipe in trough 14 in a first raised position as shown in the drawing, and coupling positioning device 24 is axially aligned with the pipe in a second lowered position. Further, coupling positioning device 24 is, when arm 20 is in its first position as shown, axially aligned with the bottom coupling 30 in coupling feed trough 32. Feed trough 32 can comprise a simple gravity-replenished hopper as is known in the art. The section of the invention indicated by items 20–32 functions on a timed cycle which is interlocked with two sensing devices, items 34 and 36 of FIG. 4, which can comprise microswitches or other suitable sensing means. These two sensing devices indicate respectively the presence or absence of a coupling 30 in trough 32, and the presence or absence of a properly positioned pipe in trough 14. When both these sensors are satisfied, a driving means such as an electric motor 38 is actuated to initiate the timed cycle, as will be explained in further detail in conjunction with FIGS. 4 and 5.

Figure 4:
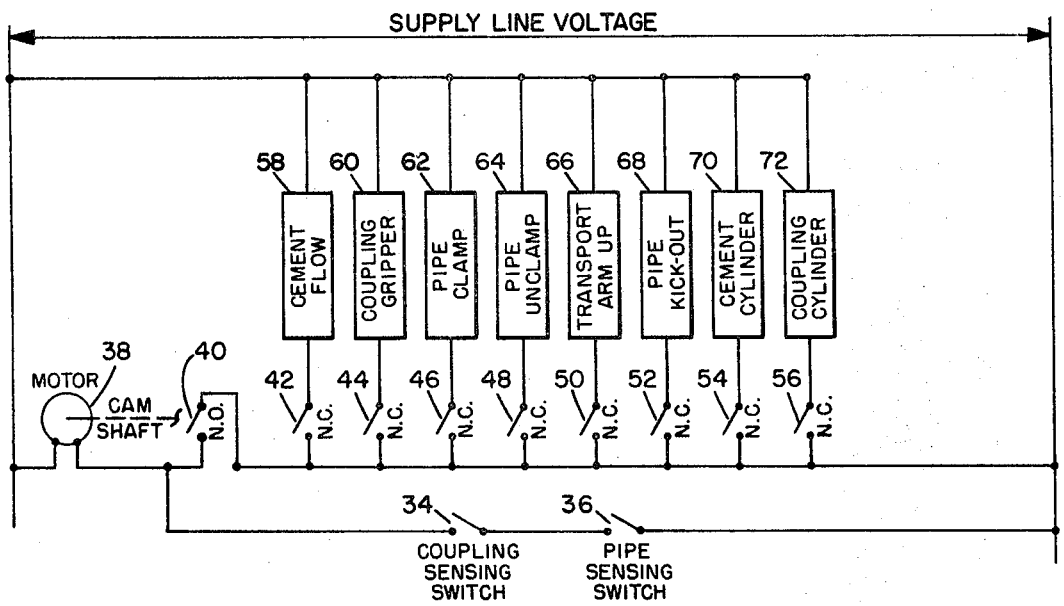
FIG. 4 is a wiring diagram of a timing device useful in the present invention.

Referring now to FIG. 4, there is shown schematically a suitable cycle timing device for operation of the present invention. The timing assembly comprises a motor 38 driving a cam shaft, in which the cams of the shaft open and close electrical switches 40–56. Switch 40 is conveniently of the normally-open type, i.e. a raised portion of cam lobe is required to close it, while switches 42–56 are of the normally-closed type whereby a raised cam lobe will open the switch. In order to follow operation of the timer, assume that switches 34, 36 and 40 are all open, i.e. that coupling hopper 32 is empty, pipe trough 14 is empty, and the cam adjacent switch 40 is at a low point. Motor 38 will be inactive. When couplings are loaded into hopper 32, switch 34 is closed. Then, when a plastic pipe moves into the proper position in trough 14, switch 36 is closed. This activates motor 38, which starts rotating its cam shaft. The cam lobe associated with switch 40 is arranged to close switch 40, and to hold it closed through the remainder of the cycle. When, during the cycle, any of switches 42–56 are closed, it actuates the corresponding solenoid 58–72, which are the solenoids of valve controlling air or hydraulic fluid to the various power cylinders of FIG. 1.

Figure 3:
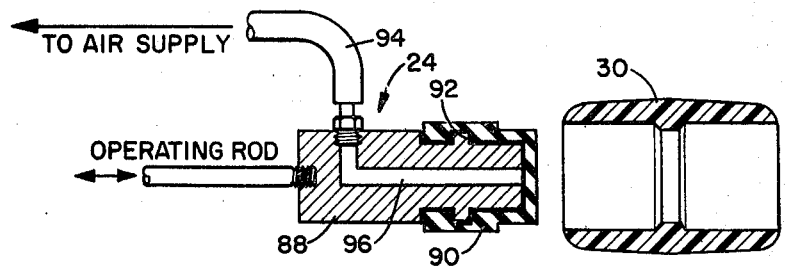
FIG. 3 is a sectional view of a gripping device, and a coupling which is to be gripped, according to an embodiment of the invention.
Figure 2:
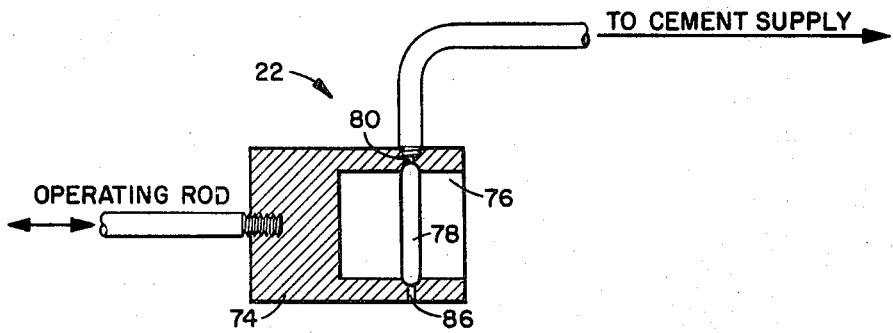
FIG. 2 is a sectional view of a cementing device useful in the present invention.

Turning next to FIGS. 2 and 3, there are shown in detail respectively the cement applicator 22 and the coupling gripper 24. Application 22 comprises a housing 74 with a cylindrical hollowed end 76 of a diameter to receive the plastic pipe being treated with a loose fit. Inside hollow 76 is an annular groove 78, which is in communication by way of passage 80 with a source of liquid adhesive, indicated schematically as 82. Source 82 can conveniently comprise a container of liquid adhesive with suitable pressure, such as by gaseous nitrogen or other inert gas to force the adhesive from the container 82 by way of flexible pipe 84 and solenoid valve 58 to annular groove 78. Thus, when a pipe end is within hollow 76, and valve 58 is opened, cement will be forced onto the periphery of the pipe end; excess cement can escape by way of weep hole 86. The amount of cement applied can be adjusted by changing the pressure over the cement, the viscosity of the cement, or the time for which valve 58 remains open. Coupling gripper 24 comprises a generally cylindrical finger 88 with a flexible (such as rubber) cover 90 on one end, which can be held onto the finger by an annular ridge and groove arrangement such as at 92. There is also provided a source of pressurized air, which passes via solenoid valve 60 and flexible pipe 94, through passage 96. When the rubber cover end 90 of finger 88 is inserted into an end of a coupling 30, and then pressurized, the coupling is tightly gripped thereon.

Figure 5:
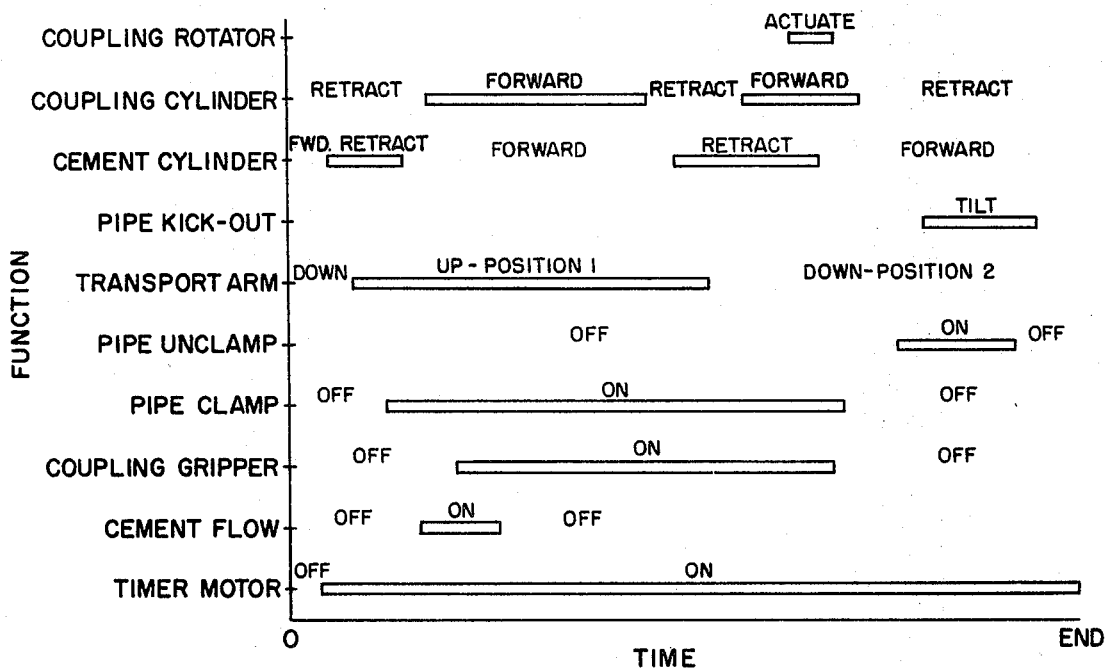
FIG. 5 is a diagram of a time cycle suitable for practicing the invention.

Returning now to the description of the cycle, motor 38 has been activated and locked in operation by switch 40. Power cylinder 28 is in its second or lower position. Switch 54 is actuated by its cam to cause solenoid valve 70 to activate the power cylinder which retracts the cement applicator 22 away from a fixed pad 98, the purpose of which is to prevent adhesive in applicator 22 from drying up when not in use. Coupling gripper assembly 24 is in a retracted position at this time. Next, swing arm assembly 20 is raised to its first or raised position, as shown in the drawing, by power cylinder 28 through activation by solenoid valve 66 and cam switch 50. The pipe is now clamped in place in trough 14 by switch 46, solenoid valve 62, and the power cylinder of clamp assembly 18. Cement applicator assembly 22 is now moved forward by switch 54, etc., so that hollow 76 is covering the end of the positioned plastic pipe. Cement is then applied by cam switch 42 and solenoid valve 58. At about the same time, coupling gripper 24 is moved forward by switch 56, solenoid valve 72, and the appropriate power cylinder so that finger 88 enters the end of a coupling 30 in hopper 32. Rubber cover 90 is now pressurized by cam switch 44 and solenoid valve 60 so as to grasp the coupling. Meanwhile, cement flow has been stopped by solenoid valve 58, etc. Coupling gripper assembly 24, with a coupling gripped thereon, and cement applicator 22 are now retracted by the appropriate cam switches, solenoid valves, and power cylinders. Swing arm 20 is now lowered to its second position. Coupling positioning assembly 24 is now moved forward to push the gripped coupling 30 onto the cement-bearing end of the pipe. In a preferred embodiment of the invention, a power cylinder 100 now is activated to turn finger 88 of the coupling gripper through an arc of several degrees, thus spreading the cement more evenly between the coupling and the pipe end. This can be effected by another cam switch and solenoid valve, not shown, in FIG. 4, but indicated in FIG. 5. Rubber cover 90 is now caused to be depressurized, and positioning assembly 24 is then retracted. Meanwhile, cement applicator 22 has again been moved forward against pad 98. Lastly, pipe clamping assembly 18 is activated by cam switch 48 and solenoid valve 64 so as to release the clamping action, and cam switch 52 with solenoid valve 68 actuates a power cylinder, not shown, to tilt trough 14 around axis 16, dumping out the completed pipe and coupling assembly. The appropriate cam switches, etc., return trough 14 into position to receive another pipe, and to allow cam motor drive switch 40 to open. The apparatus of the invention is now in its original condition, ready for another cycle. FIG. 5 illustrates a typical time cycle diagrammatically.

It will be obvious that many variations are possible within the scope of this invention. For example, hydraulic actuators have been indicated as powering the various movements of the device, although it will be obvious that other means, such as electric motors operating rack and pinion gears, can also provide the desired linear motions. In this regard, switches 42–56 have been indicated as actuating the coils 58–72 of solenoid valves, which in turn control the various hydraulic actuators. These switches alternatively can directly actuate the electric motors just mentioned. A cammed cycle timer has been indicated, but any other suitable means for effecting sequential actuation of a plurality of functions will suffice. Further, the precise sequence of steps illustrated in FIG. 5 need not be observed, such as the relative order of advancing and retracting assemblies 22 and 24 with respect to each other.

Although this invention has been described with respect to particular embodiments thereof, it is not to be so limited, as changes and modifications may be made therein which are within the spirit and scope of the invention as defined by the appended claims.

What is claimed is:

1. Apparatus for sequentially applying liquid adhesive and a cementable fitting to the end of a length of cementable pipe, which apparatus comprises:
   (a) means for positioning said pipe in a predetermined location,
   (b) timing means for sequentially actuating the plurality of means hereinafter defined as means (c), (d), and (e),
   (c) means for applying liquid adhesive to an exterior surface of an end of said pipe at said predetermined location,
   (d) means for releasably engaging, in a first position, said fitting, said means being adapted to transport the thus-engaged fitting from said first position and to place same at a second position on said end of said pipe and there to disengage from said fitting, and
   (e) means for removing said pipe and its thus-placed fitting from said predetermined location.

2. The apparatus of claim 1 wherein said means for releasably engaging further comprises means for imparting a rotary motion, around the longitudinal axis of said pipe, to said fitting while in said second position.

3. The apparatus of claim 2 wherein said fitting comprises a coupling.

4. Apparatus for sequentially applying liquid adhesive and a plastic coupling to the end of a length of plastic pipe, which apparatus comprises:
   (a) means for positioning said pipe in a predetermined location,
   (b) means for releasably holding said coupling in a first position,
   (c) means for sensing the presence of said pipe in means (a) and the presence of a coupling in means (b),
   (d) timing means, responsive to said sensing means, for sequentially actuating the plurality of means hereinafter defined as means (e), (f), (g), (h), and (i),
   (e) means for clamping said pipe in said predetermined position,
   (f) means for forcing a predetermined volume of liquid adhesive onto the exterior cylindrical surface of an end of said pipe,
   (g) transport means adapted, in a first position, to releasably engage said coupling at means (b), to transport the thus-engaged coupling from said first position to a second position on said end of said pipe, and there to disengage from said coupling,
   (h) means for releasing the clamping means (e), and
   (i) means for removing said pipe from said predetermined location.

5. The apparatus of claim 4 wherein said transport means comprises an arm means carrying linear motion means having at an extremity thereof means for releasably engaging said coupling, said linear motion means being moveable in a direction substantially parallel to the longitudinal axis of said pipe between an extended position and a retracted position, and said arm means being moveable between said first position wherein said means for releasably engaging is aligned with the means (b) and said second position wherein said means for releasably engaging is aligned with said end of said pipe.

6. The apparatus of claim 5 wherein said means for releasably engaging comprises flexible means substantially conforming in configuration to an inner surface of said coupling, said flexible means being inflatable by fluid pressure to tightly engage said inner surface.

7. The apparatus of claim 6 wherein said means for releasably engaging is rotatable around the longitudinal axis of said pipe while in said second position.

8. The apparatus of claim 4 wherein means (f) comprises linear motion means moveable in a direction substantially parallel to the longitudinal axis of said pipe between an extended position and a retracted position, said linear motion means carrying at an extremity thereof adhesive applicator means comprising a cavity substantially conforming in interior configuration to said end of said pipe, said cavity further containing adhesive distribution means operatively connected to a source of liquid adhesive under pressure.

References Cited

UNITED STATES PATENTS

| | | | |
|---|---|---|---|
| 2,772,881 | 2/1942 | Stevens | 156—366 |
| 3,186,891 | 6/1965 | Gelling et al. | 156—366 |
| 3,301,737 | 1/1967 | Schmidt | 156—363 |

SAMUEL FEINBERG, Primary Examiner

U.S. Cl. X.R.

156—366, 423